(12) United States Patent
Liu et al.

(10) Patent No.: US 7,117,574 B2
(45) Date of Patent: Oct. 10, 2006

(54) DETERMINING EXPECTED FATIGUE LIFE OF HARD MACHINED COMPONENTS

(75) Inventors: Chunghorng R. Liu, West Lafayette, IN (US); Salah Ramadan Agha, Gaza Strip (IL)

(73) Assignee: Purdue Research Foundation, West Lafayette, IN (US)

( * ) Notice: Subject to any disclaimer, the term of this patent is extended or adjusted under 35 U.S.C. 154(b) by 567 days.

(21) Appl. No.: 10/389,241

(22) Filed: Mar. 14, 2003

(65) Prior Publication Data
US 2004/0016326 A1    Jan. 29, 2004

Related U.S. Application Data

(60) Provisional application No. 60/364,120, filed on Mar. 15, 2002.

(51) Int. Cl.
*B23Q 17/00* (2006.01)
(52) U.S. Cl. .................................................. 29/407.01
(58) Field of Classification Search ............. 29/407.01, 29/407.08, 898.08, 404, 557, 558; 148/906, 148/316, 318
See application file for complete search history.

(56) References Cited

U.S. PATENT DOCUMENTS 3,817,796 A * 6/1974 Kramer I ..................... 148/671
5,878,496 A * 3/1999 Liu et al. ................ 29/898.066
6,823,740 B1 * 11/2004 Huang .......................... 73/787
2001/0047675 A1 * 12/2001 Arola et al. .................... 72/53

OTHER PUBLICATIONS

Bingyuan et al., "Calculation for Rolling Contact Fatigue Life and Strength of Case-Hardened Gear Materials by Computer", Journal of Testing and Evaluation, 1993, 21(1), pp. 9-13.
Guo et al., "Residual Stress Formation Mechanism and its Control by Sequential Cuts", Transactions of NAMRI/SME, May 2000, vol. XXVIII, pp. 179-184.
Liu et al., "The scatter of surface residual stresses produced by face-turning and grinding", Journal of Machining Science and Technology, 2001, vol. 5, No. 1, pp. 1-21.
Yang et al., "An Experimental Study on Fatigue Life Variance, Residual Stress Variance, and Their Correlation of Face-Turned and Ground Ti 6A1-4V Samples", Journal of Manufacturing Science and Engineering, Nov. 2002, vol. 124, pp. 809-819.

* cited by examiner

*Primary Examiner*—John C. Hong

(57) ABSTRACT

A method of determining expected fatigue life of machined bearing races or other components wherein a hardened surface of each bearing race is machined to provide a machined surface including the steps of determining hardness distribution and residual stress distribution along a depth into the machined surface as a function of cutting parameters, determining a relationship of expected fatigue life of the machined bearing races as a function of the hardness distribution and the residual stress distribution using a fracture mechanics model, and determining expected fatigue life from the relationship using actual cutting parameters employed in machining the hardened surface of the bearing races. Cutting conditions to optimize fatigue life can be selected based on the expected fatigue life.

22 Claims, 13 Drawing Sheets

DETERMINING EXPECTED FATIGUE LIFE OF HARD MACHINED COMPONENTS

This application claims the benefits of provisional application Ser. No. 60/364,120 filed Mar. 15, 2002.

CONTRACTUAL ORIGIN OF THE INVENTION

This invention was supported in part by funding from the National Science Foundation under Contract/Grant No. NSF 9713748 DMI. The Government may have certain rights in the invention.

FIELD OF THE INVENTION

The present invention relates to the machining of hardened components in a manner that permits expected fatigue life of the machined components to be predicted and machining conditions to be selected accordingly. The definition of machining involved in the invention is to use tools with geometries definable when sharp, in contrast to grinding or other processes where random abrasive particles are used for effecting material removal. The class of machining pursuant to the invention can also be referred to as deterministic machining.

BACKGROUND OF THE INVENTION

U.S. Pat. No. 5,878,496 describes a method of manufacturing a component by superfinish hard machining wherein the component is formed, hardened by heat treatment, and then hard machined to achieve a surface finish that is comparable to abrasive-based superfinishing operations such as finish grinding, honing, lapping, polishing, electropolishing, and superfinishing while imparting residual stress to the hard machined component in a manner to optimize its service life, such as fatigue life of a hardened bearing race. The hard machining method of the patent involves machining the pre-hardened surface of the component by turning or other cutting operation to achieve the desired surface finish. For example, hard turning typically can achieve a surface finish of 32, preferably 16, microinches average surface roughness ($R_a$) or less on a hardened bearing steel component having a Rockwell hardness of $R_c$ of 35 and higher, such as $R_c$ of 60 or more while imparting a residual stress thereto that optimizes fatigue life. As described in the patent, practice of such hard machining eliminates the need for separately performed machining steps or operations that include rough machining prior to hardening and multiple grinding operations and abrasive-based superfinishing subsequent to hardening in manufacture of a bearing race.

The patent involves modeling the component by actual physical testing and/or computer software modeling thereof, applying in-service loading conditions to the model to determine the level and location of in-service stresses on the component, determining a critical in-service stress that affects service life, determining particular hard machining parameters to impart a particular residual stress to counter the critical in-service stress and a particular surface finish to the pre-hardened component, and then hard machining the pre-hardened surface of the component using the determined hard machining parameters to impart the particular residual stress and surface finish thereto to optimize service life of the machined component and reduce the number of machining operations needed to manufacture the component.

The determination of particular hard machining parameters is made by determining interelationships of machining parameters to residual stress and to surface finish. Such determinations are made by fabrication of a number of specimens using different combinations of machining parameters (e.g. cutting speed, feed rate, and depth of cut) and then modeling the interrelationship of the machining parameters with separate equations for surface finish and integrity to achieve residual stress. For example, an interrelationship of surface finish and machining parameters is determined using equation A of the patent, while an interrelationship of residual stress distribution and machining parameters is determined using equations B(1) and B(2) of the patent.

In the past in the manufacture of bearing races, each bearing race is formed and then annealed in preparation for rough turning in the relatively soft condition of the bearing material. The rough turned bearing race then is hardened by heat treatment and/or case hardening followed by double disk grinding, cylindrical grinding, centerless grinding and finally abrasive-based superfinishing. The expected fatigue life of bearing races made this way has been determined by industry by destructive testing under anticipated service loading conditions. Such destructive testing requires expensive equipment and labor, and extended testing time to determine fatigue life of such bearing races.

SUMMARY OF THE INVENTION

The present invention involves the discovery that the fatigue life of hard machined components is consistent enough, among those machined by the same cutting conditions, that fatigue life prediction is feasible and practical, the preferred model of prediction being based on fracture mechanics models. The present invention provides for the machining of hardened components in a manner that permits the expected fatigue life of the machined components to be determined for different cutting conditions and the cutting conditions to be selected accordingly to control fatigue life. An illustrative embodiment of the invention involves a method of machining a hardened surface of each of a plurality of formed components to provide a machined surface thereon including the steps of determining the fatigue life provided by different cutting conditions that can be employed to machine the hardened surface, selecting a particular one of the different cutting conditions that provides an improvement in fatigue life, and machining the hardened surface of each of the components using the selected particular one of the cutting conditions. The cutting conditions each includes, but is not limited to, one or more of cutting speed, feed rate, depth of cut, lubrication, and cooling.

In a particular illustrative embodiment, the invention involves the machining of a hardened surface of the formed components as described above where the hardened surface is machined to provide a machined surface finish preferably of 32 microinches or less $R_a$ in conjunction with determining a relationship of expected fatigue life of the machined components as a function of the hardness distribution and the residual stress distribution along the depth into the machined surface for different cutting conditions using a fracture mechanics model. The expected fatigue life of the hard machined components is determined from the relationship based on the particular cutting parameters employed. This embodiment of the invention combines the attributes of the hard machining method and fracture mechanics modeling in the machining of components, while at the same time allowing determination of the expected fatigue life of such machined components.

In manufacture of steel bearing races wherein a pre-hardened bearing surface is directly hard machined, the hardness distribution and the residual stress distribution along the depth into the machined surface are determined as a function of different cutting parameters and a relationship of expected fatigue life of the machined bearing races is determined as a function of the hardness and the residual stress below the machined surface using a fracture mechanics crack propagation model. The hardness distribution and/or residual stress distribution can be determined on an experimental basis using physical specimens or on an analytical basis using computer models including finite element analysis. Features of the present invention will become more apparent from the following detailed description taken in conjunction with the following drawings.

DESCRIPTION OF THE INVENTION

Figure 1:
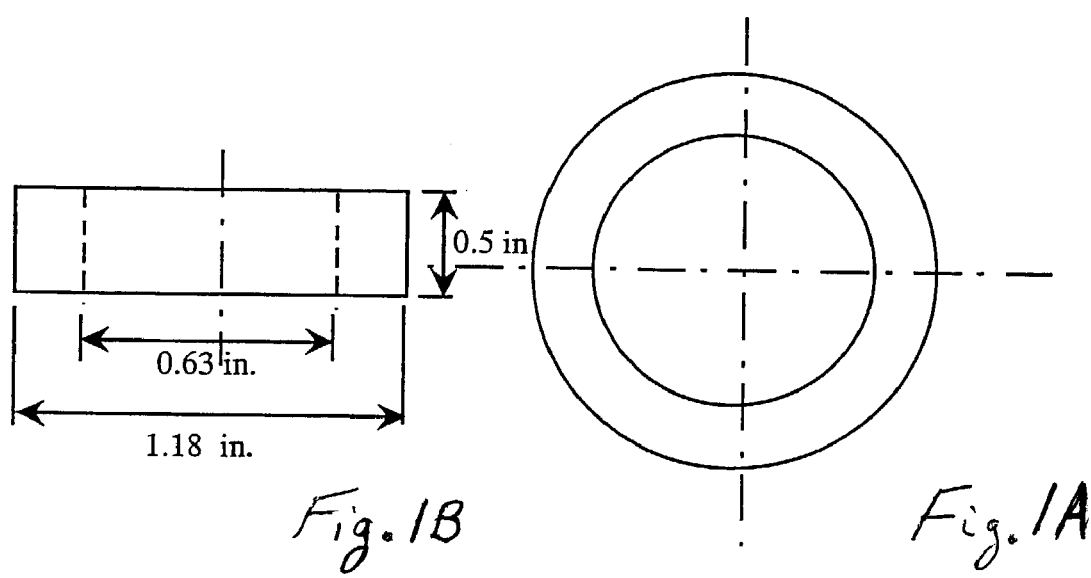
FIG. 1A is an elevational view of a bearing race specimen.
FIG. 1B is a side elevation of the bearing race specimen of FIG. 1A.

The present invention involves in an illustrative embodiment the machining of hardened steel components in a manner that permits the expected fatigue life of the machined components to be determined using fracture mechanics modeling without the need for destructive testing. In one aspect, the present invention involves developing a relationship between fatigue life and different cutting conditions that can be employed to machine the hardened component surface, determining fatigue life for the different cutting conditions from this relationship, selecting particular cutting conditions that result in an improvement (e.g. best) fatigue life, and machining the hardened surface of a plurality of the components using the selected cutting conditions. Each of the cutting conditions includes one or more of cutting speed, feed rate, depth of cut, lubrication, and cooling.

Pursuant to one illustrative aspect, the present invention combines the hard machining method described in U.S. Pat. No. 5,878,496 and fracture mechanics modeling to manufacture machined components, such as a bearing races, and to allow determination of the expected fatigue life of such machined components. The invention recognizes that the hard machining method provides a hardness distribution and a residual stress distribution along the depth into the machined surface (e.g. depth beneath the machined surface) that are consistent enough among numerous machined components machined using the same cutting conditions as to enable fracture mechanics modeling to be employed in the prediction of expected fatigue life of the machined components. Although the invention is described below for purposes of illustration with respect to machining of hardened bearing races by hard turning, the invention is not so limited and can be used to manufacture other components such as gears, cams, and other components that are subjected to rolling contact loading conditions in service. The invention can involve hard machining operations such as including, but not limited to, turning, facing, milling, boring, broaching, drilling, and similar type machining operations where material is cut from the pre-hardened surface of the component in contradistinction to grinding, superfinishing and other traditional finishing operations that are conventionally employed as finishing operations to achieve surface finish of 32 microinches $R_a$ or less.

The invention is described below with respect to hard turning of bearing races since, under certain cutting conditions, hard turning can produce turned surfaces with surface finish as good as 2 to 8 microinches $R_a$, which is comparable to that achieved by traditional grinding and super-finishing processes. Such hard turned bearing surfaces can meet manufacturer's requirements of a bearing surface. Hard turned bearing surfaces thus have the potential to replace bearing surfaces produced by grinding in some applications. The use of hard turning of bearing surfaces would result in a large reduction in the manufacturing process steps currently used to produce bearings and lead to a large savings in terms of machining time, assembly, and capital costs. The invention is described below for purposes of illustration as providing a verification of the disclosed method to accurately model the rolling contact fatigue life of such hard turned bearing surfaces for use in prediction of expected fatigue life of such hard turned components and in the selection of cutting conditions to provide a particular (e.g. optimum) fatigue life of machined components.

Referring to FIGS. 1A, 1B, ring specimens of AISI 52100 steel with 1.18 inch outer diameter, 0.63 inch inner diameter, and 0.5 inch thickness, were selected to illustrate the invention. Specimens with such dimensions can be uniformly through-hardened. Moreover, the specimen can be easily used for residual stress measurements using a standard fixture on an x-ray machine. The AISI 52100 steel comprised 0.98–1.1 weight % C, 0.25–0.45 weight % Mn, 0.025 weight % max P, 0.025 weight % max S, 0.15–0.3 weight % max Si, 1.3–1.6 weight % Cr, and balance iron.

The specimens were painted. To check for roundness, they were turned using a very small depth of cut. This procedure was repeated until the paint completely disappeared. The, the specimens were ground to improve perpendicularity and parallelism. Before heat treatment, the edges of the specimens were checked for their sharpness. The edges were slightly tapered to avoid cracking at the sharp corners. All specimens were held at 1550 degrees F. for 3 hours in a 1% carbon potential atmosphere, then they were quenched in oil and kept at 140 degrees F. for 15 minutes. A sub-zero treatment was performed to improve stability of the specimens. To reduce brittleness and tensile residual stresses and increase ductility and toughness, tempering was performed at 350 degrees F. for 1.5 hours. Then the specimens were cooled to room temperature. The hardness of the heat treated specimens was measured using the Rockwell C scale. Only specimens with hardness in the range of 62-6 $R_c$ were deemed acceptable, hard machined and then tested as described below. The heat treated specimens has the following mechanical properties: 30000 Kpis Young's modulus, 256 Kpsi yield stress, $7.7 \times 10^{-6}$/F thermal expansion coefficient, 0.058 BTU/(ft F/m) thermal conductivity, a and 109.5 BTU/lb.F specific heat.

The specimens were hard turned (hard faced) pursuant to U.S. Pat. No. 5,878,496 using the cutting configuration shown in FIG. 2 and machining setup as follows:

Type of cut: facing
Specimen: AISI 52100 through-hardened as described above (62–63 $R_c$)
Cutting tool material: BZN 8100 from GE Super-abrasives
Cutting tool geometry: BRNG-42, round disk-shaped tool with 1.27 cm diameter, 0.318 cm thickness, lead angle of 90 degrees, clearance angle of 0 degrees
Machine tool: Cinturn 8u -40 series 1208 from Cincinnati Milacron
Coolant: None
Chuck: Standard 3-jaw
Cutting configuration: see FIG. 2
Cutting conditions or parameters: see Table 1

Hard dry machining of hardened components is described more generally in U.S. Pat. No. 5,878,496, the teachings of which are incorporated herein by reference.

Since surface roughness is an important aspect of the surface integrity of the hard machined surface, surface roughness of the machined specimens was measured using a TALYSURF measuring machine. Three parameters were used to measure the surface roughness; namely, maximum peak-to-valley height, $R_t$, the root-mean-square average roughness, $R_q$, and the average surface roughness, $R_a$. Measurements of the surface roughness were taken in direction parallel to the feed direction, FIG. 2. Many readings were taken along randomly selected lines of the surface generated. The cut-off length used for measuring the surface roughness was 0.03 inch according to the recommendation of the manufacturer of the measuring machine and also according to the cut-off length normally used to evaluate the surface roughness for bearing surfaces. For the sake of brevity, only the $R_a$ values are given in Table 1.

TABLE 1

| Condition | Speed (sfpm) | Feed(ipr) | DOC(in.) | Flank Wear(in.) | Roughness $R_a$ |
|---|---|---|---|---|---|
| 03sL | 350 | 0.002 | 0.03 | sharp | 6 μin. |
| 01s | 350 | 0.002 | 0.01 | sharp | 6 μin. |
| 0104 | 350 | 0.002 | 0.01 | 0.016 | 7.5 μin. |
| 0107 | 350 | 0.002 | 0.01 | 0.028 | 8 μin. |
| 0107SRL* | 350 | 0.002 | 0.01 | 0.028 | 9 μin. |
| 0304 | 350 | 0.002 | 0.03 | 0.016 | 7.5 μin. |

Remark
*A depth of cut of 0.001" and a sharp tool was used to remove the surface.

In Table 1, for each cutting condition listed, "Speed" is cutting speed expressed in surface feet per minute, "Feed" is the feed rate expressed in inches per revolution, "DOC" is depth of cut expressed in inches, "Flank wear" is the wear of the tool flank, expressed in inches, and Roughness is average surface roughness expressed in microinches.

For certain of the cutting conditions of Table 1, several machined specimens were sectioned, mounted, and polished for the micro-hardness study. The micro-hardness of some specimens was measured using the Knoop hardness with a load of 200 grams. From 4–6 readings were taken along the same depth and the average was taken to plot the results for condition 0104 (designated HK0104 in FIG. 3A), condition 0107 (designated HK0107 in FIG. 3B), condition 0304 (designated HK0304 in FIG. 3C), and condition 01s (designated 01s in FIG. 3D). Care was taken when sectioning and polishing to so as not to introduce strain hardening due to the polishing process. Some of the specimens were just etched and the micro-hardness was measured, and the results were compared with the micro-hardness produced by sectioning and polishing. Results from both tests were very consistent so the sectioning and polishing technique was used for all specimens. The average micro-hardness of three specimens was taken for each cutting condition. It is seen in FIGS. 3A–3D that the micro-hardness distributions along the depth into specimen surface differ for the different cutting conditions. It is interesting to note that the micro-hardness of the specimen machined using the sharp cutting tool decreases at the surface and then increases to the hardness of the bulk steel bearing material. For specimens machined using the worn cutting tool, it is notes that the minimum micro-hardness may occur at a certain depth below the machined surface. It is also noted that the standard deviation of the micro-hardness measurements increases as cutting tool flank wear increases.

Figure 2:
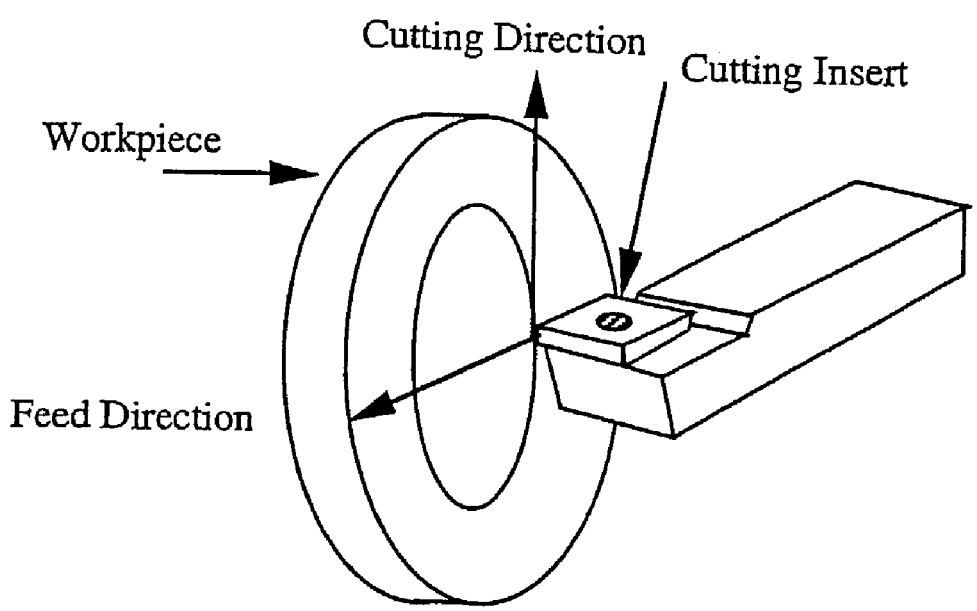
FIG. 2 is a schematic perspective view of the cutting configuration employed to cut the bearing race specimens.
Figure 3A:
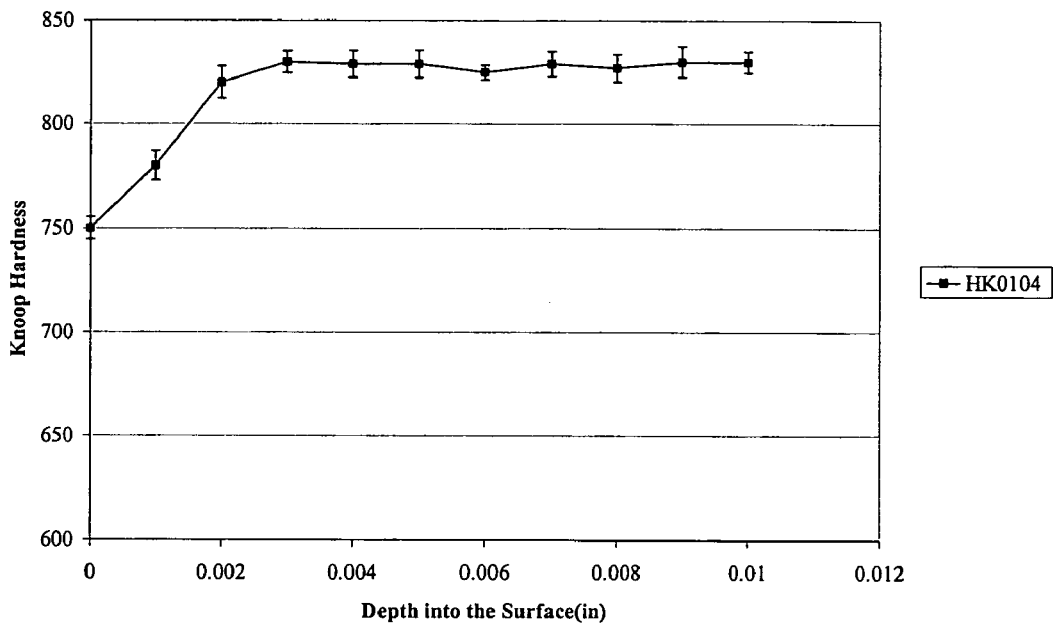
FIGS. 3A through 3D are graphs of Knoop micro-hardness along the depth into the specimen surface for specimens hard machined under different cutting conditions.
Figure 3B:
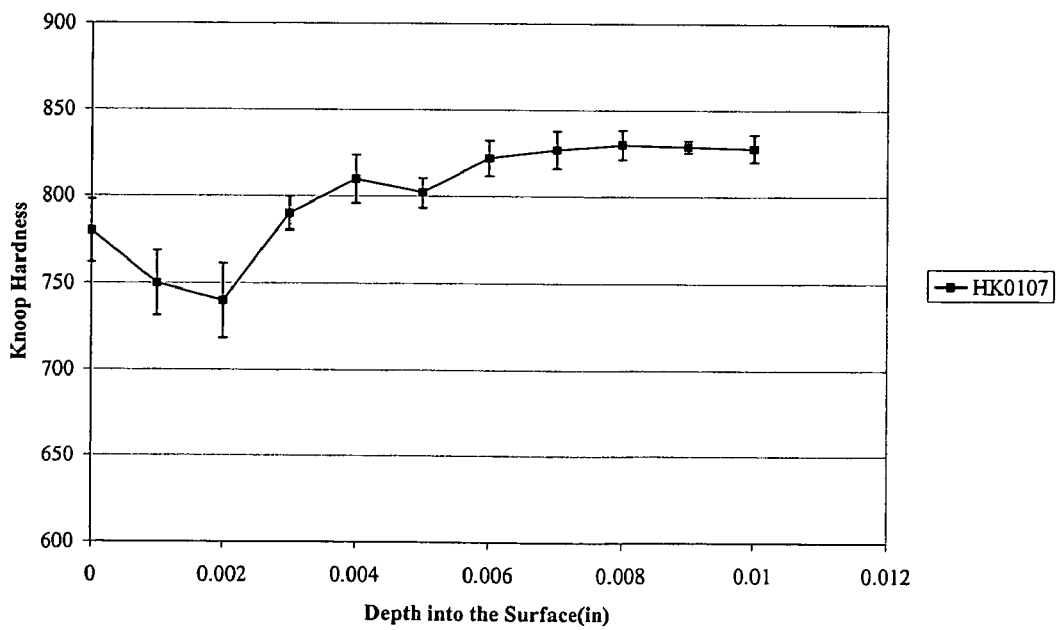
Figure 3C:
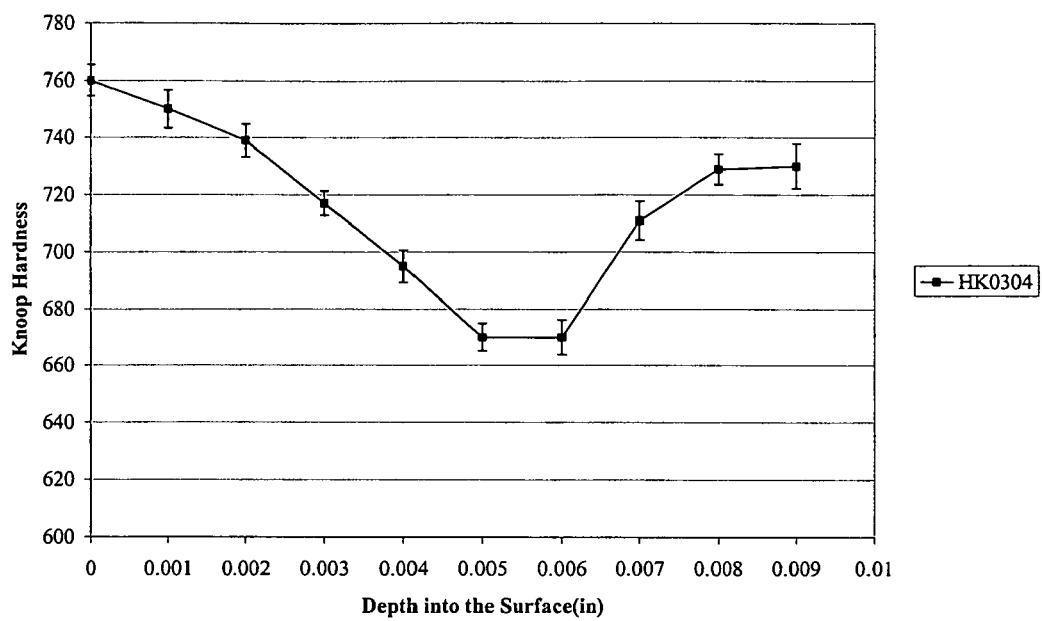
Figure 3D:
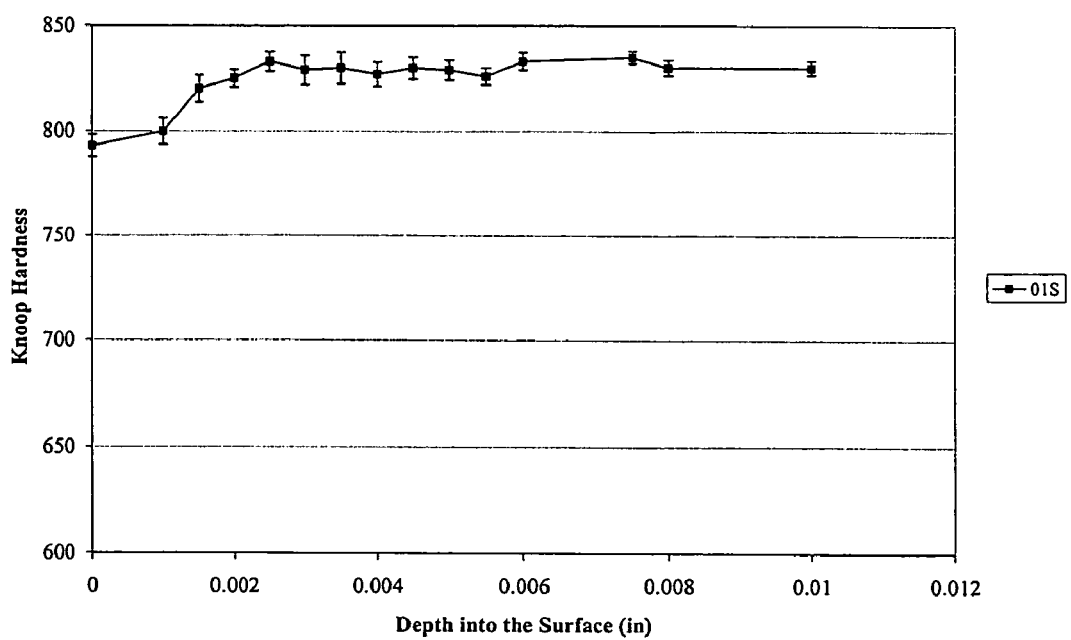
Figure 4A:
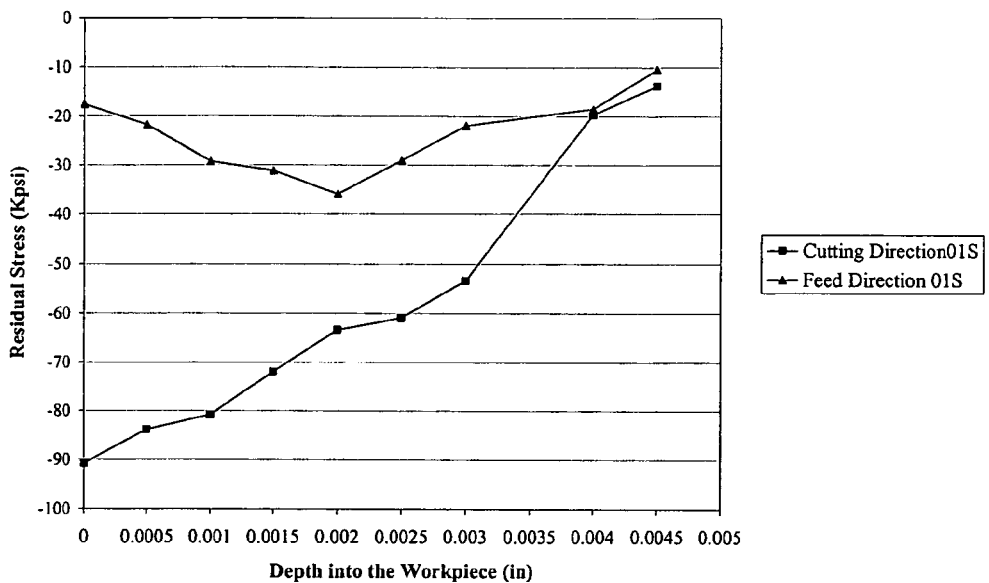
FIGS. 4A through 4C are graphs of residual stress along the depth into the specimen surface for specimens hard machined under different cutting conditions.
Figure 4B:
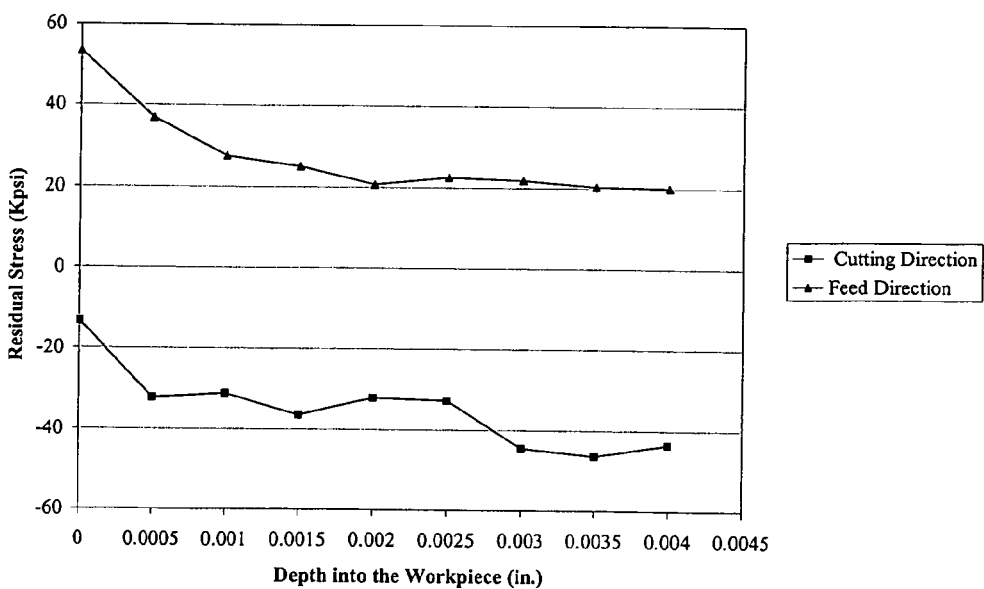
Figure 4C:
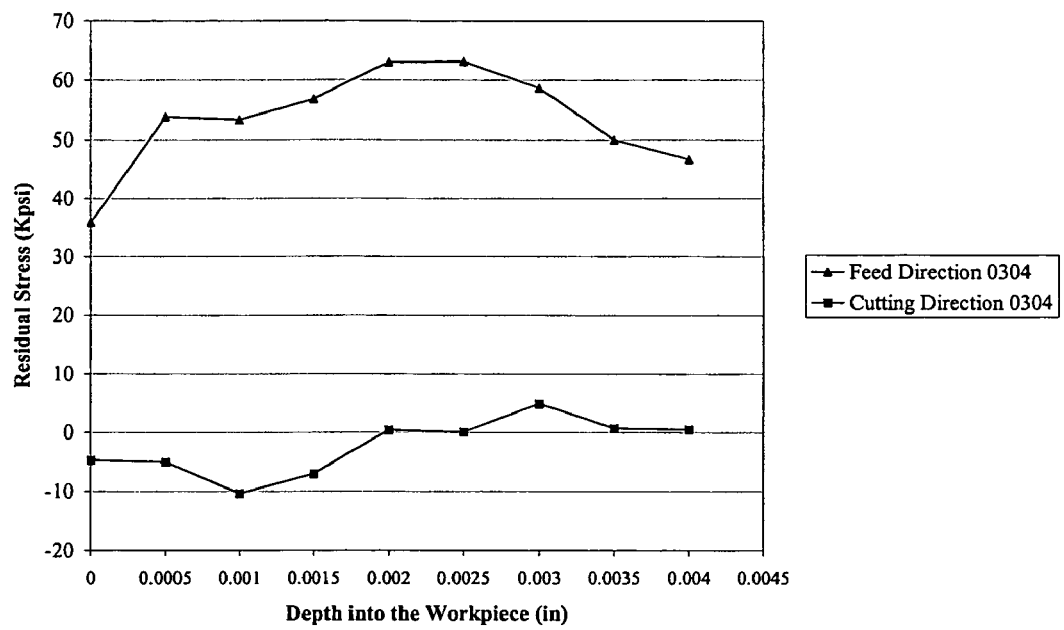

Residual stress measurements were performed using the well known x-ray diffraction method. The $\sin^2\psi$ method was used and is described by I. C. Noyan et al. in Residual Stress. Springer, Berlin, 1987. Four $\psi$ angles were used for calculating the residual stress in both cutting and feed directions. FIG. 2 shows the cutting configuration and the directions along which the residual stress was measured. The average residual stress measurements of three specimens was used for each of the cutting conditions. FIGS. 4A through 4C show residual stress distribution below the machined surface in both cutting and feed directions as produced by certain of the cutting conditions, such as condition 01s in FIG. 4A, condition 0107 in FIG. 4B, and condition 0304 in FIG. 4C.

For the purposes of estimating a constant and verifying the accuracy of the proposed prediction model, experimental fatigue tests were conducted and described below.

Rolling contact fatigue life of the hard machined specimens was measured on a simple test rig designed for rolling contact fatigue testing where each specimen was located in the rig and balls were placed on the machined surface of each specimen. The tests were run at a shaft speed of 1840 rev/min with different axial loads that produced maximum Hertzian stresses in the range of 408–944 kpsi. Grade 25 balls (0.1563 inch diameter) were sued in testing. The lubricant used in the testing was SAE-30 circulating through a 10 microinch filtered-pump feed system at a rate of 56.8 cm³/min. The rolling contact fatigue test was automatically stopped once a certain level of vibration was exceeded, using an accelerometer that was attached to the housing of the test rig and connected to a vibration monitor. The vibration level was kept fixed for all testing to enable comparison between the fatigue lives for the different cutting conditions. The balls and retainers were replaced after each test. Care was taken in the assembly and disassembly of the test rig so that results might not be adversely affected. The test rig was thoroughly cleaned by flooding it with pressurized lubricant and then dried using pressurized air after each test. Results obtained using the test rig were within 10%–17% of rolling contact fatigue life results obtained from a multi-purpose, multi-specimen FALEX testing machine run as a comparison. The tests were run at a controlled-room temperature that was kept at about 25 degrees C. The axis runout was about 1.27 mm. Finally, the film thickness parameter was calculated to be around 4.5 (see T. A. Harris, Rolling Bearing Analysis, John Willey and Sons, 1993).

As mentioned above, an aspect of the invention combines the hard machining method (as specifically described above for the ring specimens as well as in U.S. Pat. No. 5,878,496) and fracture mechanics modeling to machine the pre-hardened bearing races and to allow determination of the expected fatigue life of such machined components. The invention recognizes that the hard machining method provides a hardness distribrution and a residual stress distribution into (beneath) the machined surface that are consistent enough among numerous machined components machined using the same cutting parameters as to enable analytical modeling, and specifically fracture mechanics modeling to be employed in the prediction of expected fatigue life of the machined components. The invention thereby combines the attributes of the hard machining method and fracture mechanics modeling in the manufacture machined components to allow determination of the expected fatigue life of such machined components.

In an illustrative embodiment of the invention, a linear elastic fracture mechanics crack propagation model, that takes into account, the micro-hardness and residual stress below the hard machined surface of the bearing races, is better able to predict the fatigue life of the hard machined bearing races. The crack propagation model uses the assumption that the crack propagation is a measure of fatigue life in that most of the rolling contact fatigue life is spent in the crack propagation time. The crack propagation model uses the well known Paris law, the rate of crack growth as a function of the number of cycles, N, can be expressed as:

$$da/dN = c(\Delta k)^n \text{ where} \qquad \text{(equation 1)}$$

$\Delta k$ can be expressed as:

$$\Delta k = s\sqrt{\pi a} \qquad \text{(equation 2)}$$

where:
a is the half-length of the fatigue crack,
c is a proportionality constant,
n is an index representing material properties, taken as 3 for bearing steels, and
s is the driving force for crack growth.

Substituting for $\Delta k$ in the above equation and integrating, the number of stress cycles can be computed as follows:

$$N = \int_{a_1}^{a_2} \frac{1}{c(s\sqrt{\pi a})^n} da \qquad \text{(equation 3)}$$

In order to express the half-length of the crack "a" as a function of depth "z", the angle $\theta$ is assumed to be the angle that the crack makes with the machined surface of the bearing specimen.

Therefore, "a" can be expressed as: $a = (z_1 - z)/\sin\theta$. In this equation, $z_1$ is the point at which the ratio of $\tau_{max}/H_k$ is maximum. It is assumed that the crack initiation starts at this location.

Driving force "s" can be expressed in stress (force) units as $(\tau_{max}^2/H_k)$. That is, $s = \tau_{max}^2/H_k$ where $\tau_{max}$ is the maximum shear stress with residual stress taken into account and $H_k$ is the Knoop hardness measured on the material layer concerned. The $\tau_{max}$ value can be determined by one skilled in the art using the shear strength of the material concerned. Applicant notes that the same relationship, $s = \tau_{max}^2/H_k$, was used in by J. Bingyuan et al. in "calculation for rolling contact fatigue life and strength of case hardened gear materials by computer", Journal of Testing and Evaluation, JETVA, 21(1):9–13, 1993.

Therefore, equation 3 can be rewritten as;

$$N = \int_{z_1}^{z_2} \frac{H_k^n dz}{c(\sin\theta)^{1-n/2} \pi^{n/2} \tau_{max}^{2n} (z_1 - z)^{n/2}} \qquad \text{(equation 4)}$$

where $z_2$ is on the machined bearing surface and thus is taken as zero. In this equation, the micro-hardness $H_k$ was measured and fitted as a function of z using the least square method.

The value of the proportionality constant "c" in equation 4 was obtained by dividing the experimental life by the value of the corresponding parameter obtained from equation 4. The rest of the predicted fatigue lives for the different cutting conditions were obtained by multiplying their corresponding factors by the proportionality constant. In other words, only one constant was used to predict the fatigue lives under the different cutting conditions. From FIGS. 5A through 5C and FIG. 5F, it is apparent that the crack propagation model (equation 4) was powerful enough to predict the fatigue lives of the bearing specimens under the different cutting conditions used. FIGS. 5A through 5C and FIG. 5F establish or determine a relationship between fatigue life and the different cutting conditions of Table 1 that were employed to machine the hardened bearing races. From these Figures, fatigue life can be predicted for each particular cutting condition such that a particular one of the cutting conditions can be selected and used to machine hardened bearing races in an actual commercial production setting to provide machined bearing races with an optimum fatigue life.

Figure 5A:
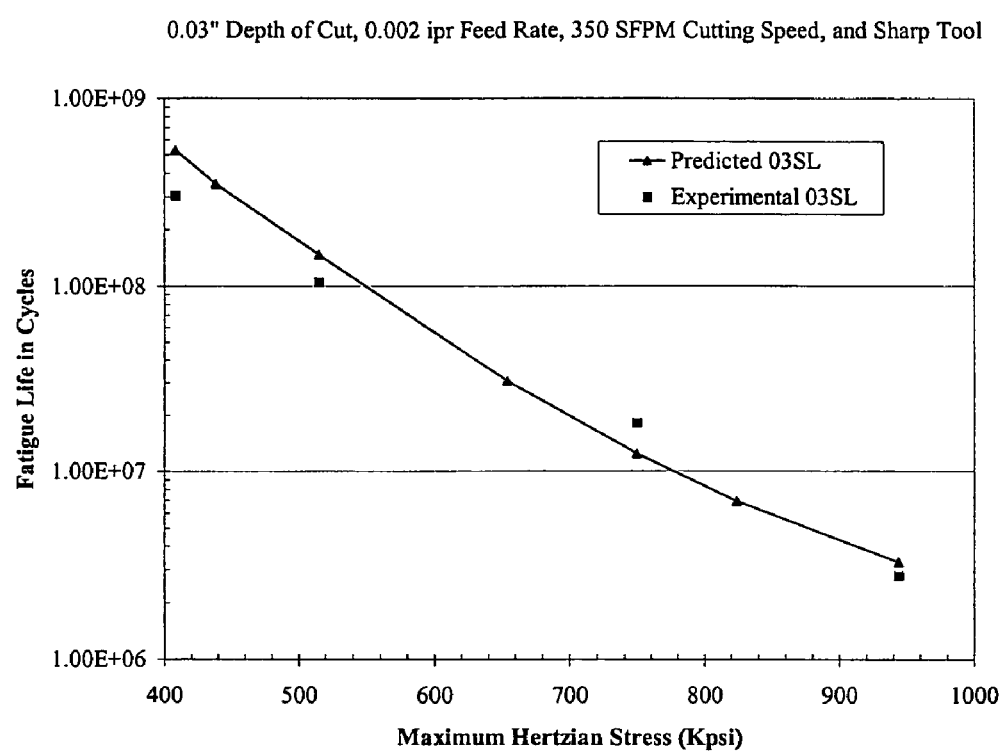
FIGS. 5A through 5F are graphs of fatigue life based on the crack propagation model versus maximum Hertzian stress for specimens hard machined under different cutting conditions set forth in Table 1, as compared with the experimental fatigue life results.
Figure 5B:
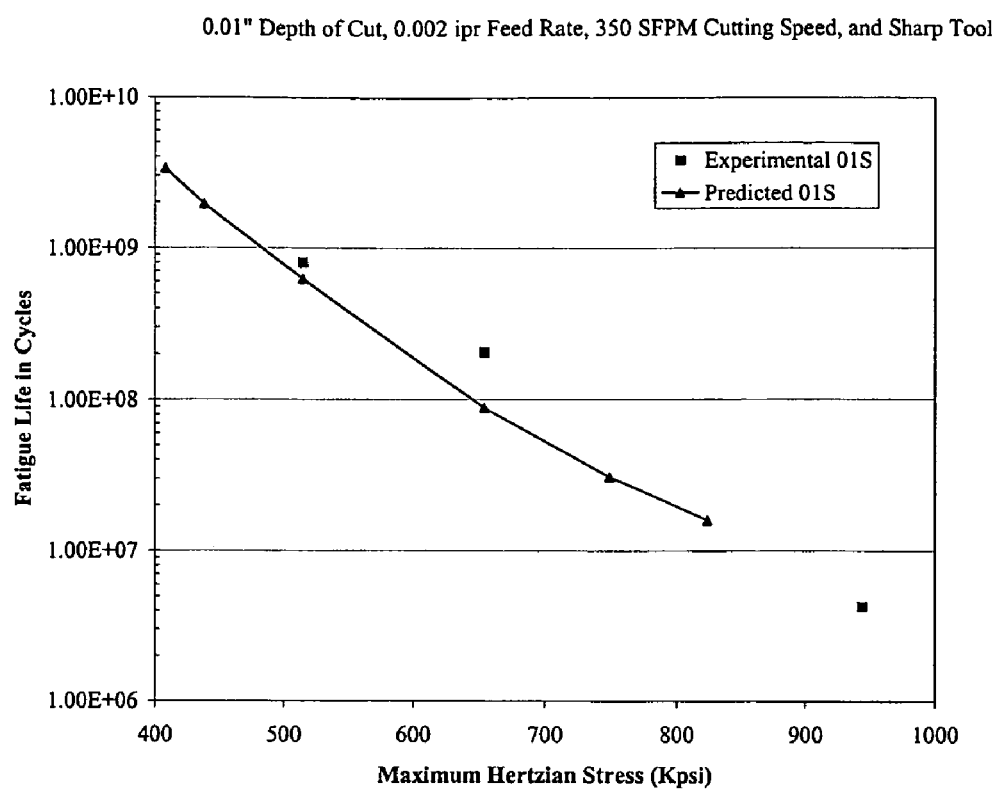
Figure 5C:
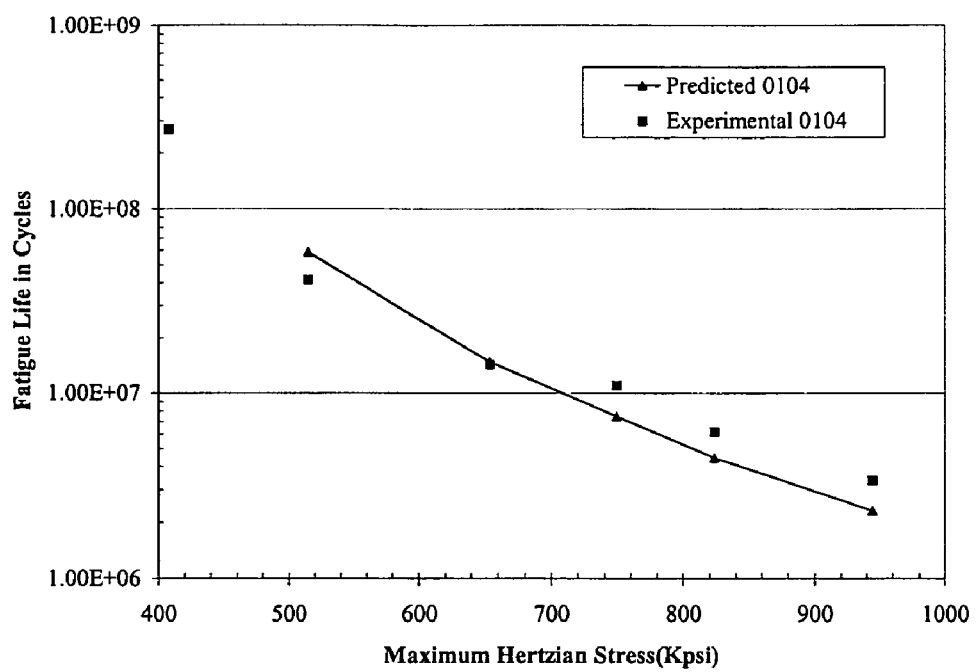
Figure 5D:
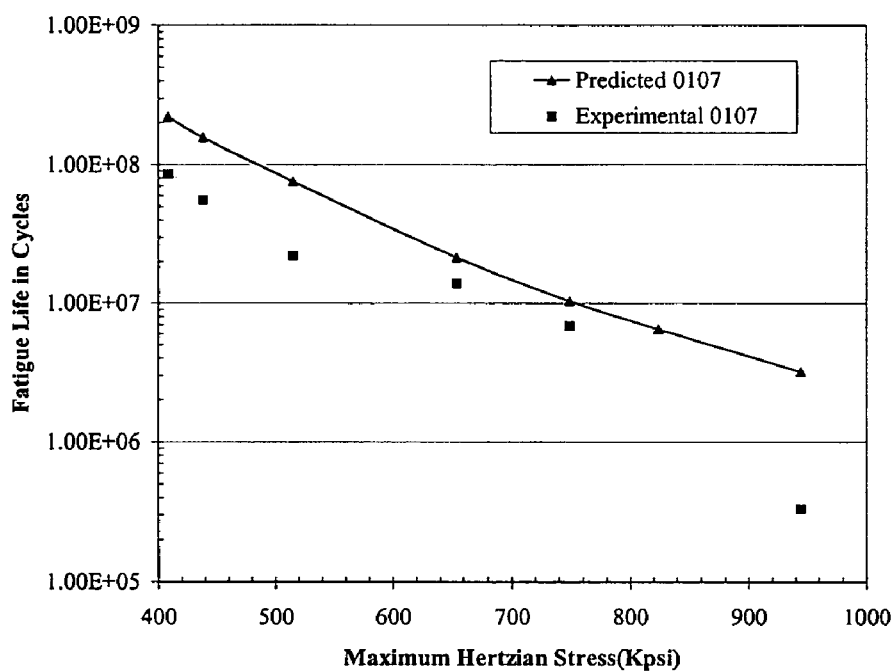
Figure 5E:
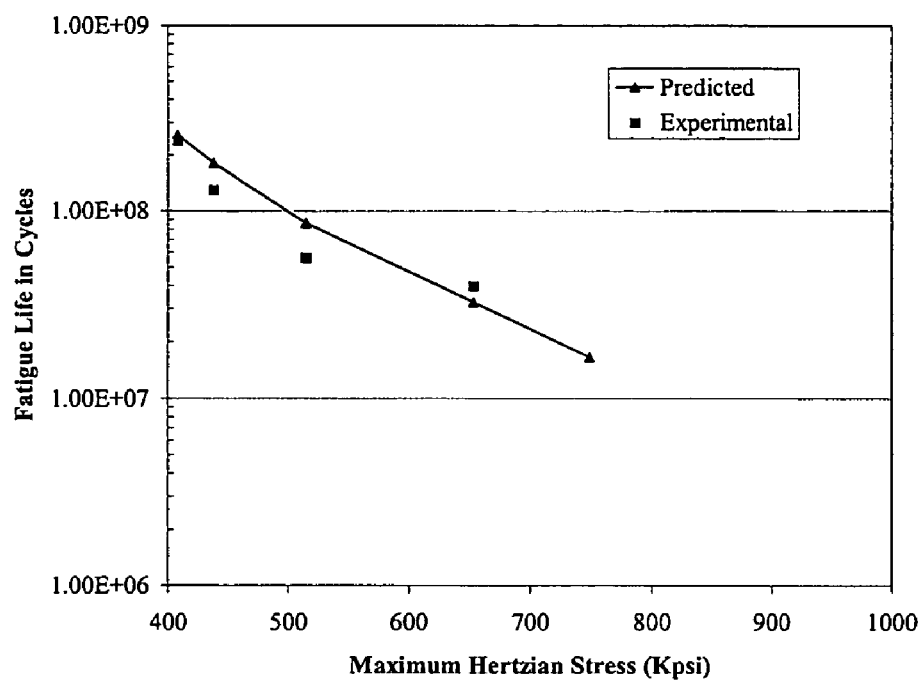
Figure 5F:
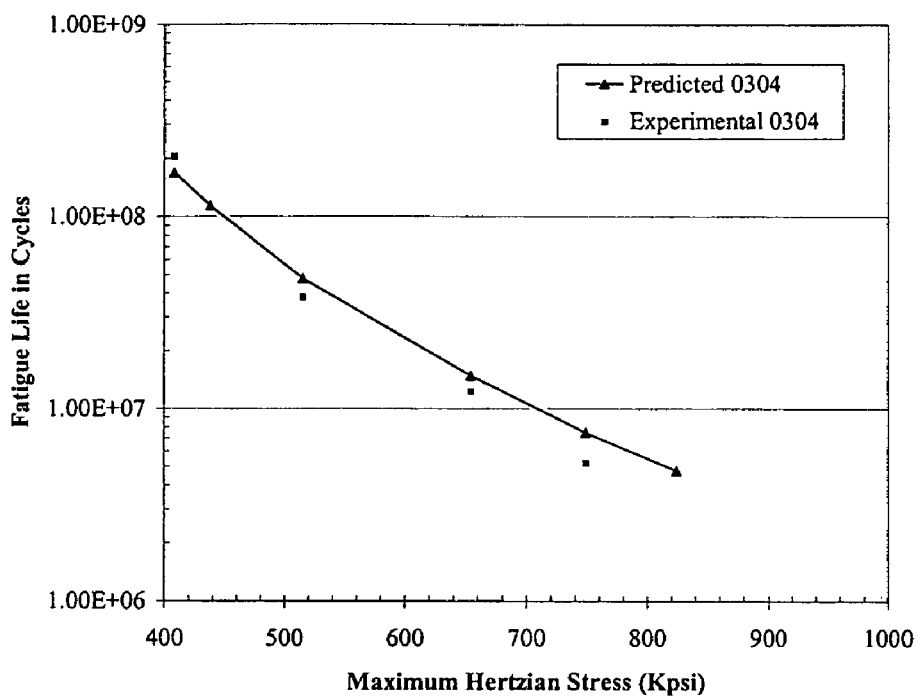

However, it is noted that the predictive power decreases for the cutting condition in which maximum tool flank wear was used (i.e. FIG. 5D with 0.28" flank wear) corresponding to cutting condition 0107 of above Table 1. This deviation can be up to 5 times in general. The observed deviation was suspected to be due to some structural changes that do not affect the bearing steel micro-hardness. Also, the large standard deviation of the hardness distribution of this specimen was also suspected to contribute to the large deviations of the experimental fatigue life from the predicted life. Therefore, to partially prove the hypothesis, the surface of some of the specimens, machined using the maximum flank wear, was removed using a sharp cutting tool using a depth of cut of 0.001 inch. It is hypothesized that the structural changes and large variations in micro-hardness due to the large flank wear were eliminated after machining using the sharp tool to remove 0.001 inch of surface material. This removal can be also accomplished by other processing methods such as honing, superfinishing, gentle grinding, etc. Then, the crack propagation model was used to predict the fatigue life of the newly machined specimens. FIG. 5E shows the experimental and the predicted fatigue lives for the cutting condition 0107SRL with the 0.001 inch depth of cut. It can be seen from FIG. 5E that the model is capable of accurately predicting the fatigue life. Thus, the hypothesis of the structural changes that are not reflected by a change in the micro-hardness is further strengthened.

The above-described crack propagation model, that takes into account the distribution of micro-hardness distribution and residual stress distribution along the depth into the hard machined surface of the bearing races, is capable of predicting the fatigue life of the hard machined bearing races.

This model takes into account the strength (measured as micro-hardness) distribution and residual stress distribution at the same time at depths beneath the machined bearing surface. Moreover, the concept of a "weak point" or the point at which the fatigue crack is believed to initiate, is more reasonable if calculated based on both the strength and stress fields. The location of the weak point as used in the crack propagation model is more accurate than that used in known crack initiation models where the crack is assumed to originate at the point of maximum critical stress.

Practice of the invention where the hard machining method is used to machine the bearing races in conjunction with fracture mechanics crack propagation modelling allows determination of the expected fatigue life of such machined bearing races.

Practice of the invention permits one to choose particular cutting conditions (e.g. a particular one of the cutting conditions listed in Table 1 that includes a particular combination of cutting speed, feed rate, and depth of cut) in a manner to optimize fatigue life of the machined components. For example, based on the fatigue life predictions for the different cutting conditions (e.g. FIGS. 5A–5F), a particular one of the cutting conditions is chosen that will optimize fatigue life of components machined using such cutting conditions.

Moreover, practice of the invention allows one to choose to include a further post-machining processing step (after machining of the component) based on the predicted fatigue life so as to further increase fatigue life above the predicted value with higher consistency. For example, one could select to hone or gentle grind the machined surfaces of the bearing races to further increase their predicted fatigue life.

Although the invention has been described with respect to certain embodiments thereof, those skilled in the art will that changes and modifications can be made thereto within the scope of the invention as set forth in the appended claims.

We claim:

1. In a method of machining a hardened surface of each of a plurality of components to provide a machined surface thereon, comprising the steps of:
   determining fatigue life provided by different cutting conditions that can be employed to machine the hardened surface,
   selecting a particular one of the cutting conditions that provides an improvement in fatigue life, and
   machining the hardened surface of each of the components using the selected particular one of the cutting conditions.

2. The method of claim 1 including developing a relationship between fatigue life and the different cutting conditions that can be employed to machine the hardened surface, and determining the fatigue life provided by the different cutting conditions by prediction from the relationship.

3. The method of claim 1 wherein the cutting conditions each includes one or more of cutting speed, feed rate, depth of cut, lubrication, and cooling.

4. The method of claim 1 wherein the fatigue life is determined based on hardness distribution along a depth into the machined surface and residual stress distribution along a depth into the machined surface as determined for each of the different cutting conditions.

5. The method of claim 4 wherein the hardness distribution and/or the residual stress distribution is/are determined on at least one of an experimental basis using specimens and on an analytical basis using computer models.

6. A method of determining expected fatigue life of machined components wherein a hardened surface of each component is machined to provide a machined surface, comprising the steps of:
   determining hardness distribution along a depth into the machined surface as a function of different cutting conditions,
   determining residual stress distribution along a depth into the machined surface as a function of the different cutting conditions, and
   determining a relationship of expected fatigue life of the machined components as a function of the hardness and the residual stress below the machined surface.

7. The method of claim 6 including determining the relationship of expected fatigue life of the machined components as a function of the hardness distribution and the residual stress distribution using a fracture mechanics model.

8. The method of claim 6 including the further step of determining expected fatigue life from the relationship based on the cutting conditions employed to machine the machined surface.

9. The method of claim 7 wherein the fracture mechanics model is a crack propagation model.

10. The method of claim 9 wherein the crack propagation model is represented by equation as follows:

$$N = \int_{z_1}^{z_2} \frac{H_k^n dz}{c(\sin\theta)^{1-n/2}\pi^{n/2}\tau_{\max}^{2n}(z_1-z)^{n/2}}$$

where N is the number of stress cycles with probability of survival, $H_k$ is Knoop hardness, c a is proportionality constant, θ is the angle is the angle that the crack makes with the machined, hardened surface, n is an index and taken as 3 for bearing steels, $\tau_{max}$ is the maximum shear stress with residual stress taken into account, $z_1$ is the depth at which $\tau_{max}$ is maximum, and z is the depth below the machined, hardened surface, and where $z_2$ is at the surface and taken as zero.

11. The method of claim 6 wherein the cutting conditions each includes one or more of cutting speed, feed rate, depth of cut, lubrication, and cooling.

12. The method of claim 6 wherein the hardness distribution is measured on an experimental basis using physical specimens or on an analytical basis using computer modeling including that of finite element analysis.

13. The method of claim 6 wherein the residual stress distribution is measured on an experimental basis using physical specimens or on an analytical basis.

14. The method of claim 6 wherein the machined, hardened surface has a surface finish of 32 microinches $R_a$ or less.

15. The method of claim 6 including the further step, after machining of the workpiece, of subjecting the machined, hardened surface to a surface processing step selected to remove a thin layer of the hard machined surface.

16. The method of claim 6 the workpiece is hardened through its entire thickness or a portion of its thickness.

17. A method of determining expected fatigue life of machined bearing races wherein a hardened surface of each bearing race is machined to provide a machined surface, comprising the steps of:
   determining hardness distribution along a depth into the machined surface as a function of cutting conditions, determining residual stress distribution along a depth into the machined surface as a function of the cutting conditions, determining a relationship of expected fatigue life of the machined bearing races as a function of the hardness distribution and the residual stress distribution using a fracture mechanics model that incorporates the hardness distribution and the residual stress distribution, and determining expected fatigue life from the relationship based on cutting conditions employed in machining the hardened surface of the bearing races.

18. The method of claim 17 wherein the machining parameters include one or more of cutting speed, feed rate, depth of cut, lubrication and cooling.

19. The method of claim 17 including the further step, after machining of the bearing race, of subjecting the machined, hardened surface to a surface processing step selected to remove a thin layer of the hard machined surface.

20. The method of claim 17 wherein the hardness distribution is measured on an experimental basis using physical specimens or on an analytical basis.

21. The method of claim 17 wherein the residual stress distribution is measured on an experimental basis using physical specimens or on an analytical basis.

22. The method of claim 17 wherein the machined, hardened surface has a surface finish of 16 microinches $R_a$ or less.

* * * * *